United States Patent [19]

Schraml-Marth

[11] Patent Number: 5,565,025
[45] Date of Patent: Oct. 15, 1996

[54] SURFACE-MODIFIED PIGMENTS AND USE THEREOF AS YELLOWNESS INHIBITORS IN PIGMENTED PLASTICS

[75] Inventor: Matthias Schraml-Marth, Zwingenberg, Germany

[73] Assignee: Merck Patent Gesellschaft mit Beschrankter Haftung, Darmstadt, Germany

[21] Appl. No.: 299,080

[22] Filed: Sep. 1, 1994

[30] Foreign Application Priority Data

Sep. 2, 1993 [DE] Germany .................. 43 29 613.0

[51] Int. Cl.$^6$ ................................................ C09C 1/04
[52] U.S. Cl. .................. 106/417; 106/449; 106/415; 428/403; 523/171; 523/200
[58] Field of Search ............................ 106/449, 415, 106/417; 428/403; 523/171, 200

[56] References Cited

U.S. PATENT DOCUMENTS 4,737,194  4/1988  Jacobson ........................ 106/439

FOREIGN PATENT DOCUMENTS 492223  12/1991  European Pat. Off. .
520313   6/1992  European Pat. Off. .

*Primary Examiner*—Mark L. Bell
*Assistant Examiner*—Scott L. Hertzog
*Attorney, Agent, or Firm*—Millen, White, Zelano, & Branigan, P.C.

[57] ABSTRACT

The invention relates to surface-modified pigments based on TiO$_2$ pigments or TiO$_2$-coated platelet-shaped substrates and overcoated with a layer consisting of borates of alkaline earth metals and/or double borates of alkali and/or alkaline earth metals and to the use thereof as yellowness inhibitors in plastics and plastics systems.

18 Claims, No Drawings

SURFACE-MODIFIED PIGMENTS AND USE THEREOF AS YELLOWNESS INHIBITORS IN PIGMENTED PLASTICS

The invention relates to surface-modified pigments based on $TiO_2$ pigments or $TiO_2$-coated platelet-shaped substrates and overcoated with a layer consisting of borates of alkaline earth metals and/or double borates of alkali and/or alkaline earth metals and to the use thereof as yellowness inhibitors in plastics and plastics systems.

BACKGROUND OF THE INVENTION

Industrially usable plastics generally contain a number of additives to improve their application properties, for example plasticizers, fillers, stabilizers, antioxidants, lubricants, release agents, antistats, colorants and further additives.

Frequently, it is found that undesirable interactions develop especially between colorants on the one hand and stabilizers and antioxidants on the other, presumably because the stabilizer and/or antioxidant molecules diffuse to the surface of the pigment particles and there lead to a yellowness reaction which frequently proceeds without exposure to light. This yellowness reaction leads, in particular in the case of light-colored pigments, to unattractive effects and appreciably impairs the aesthetics of the plastics system.

The prior art proposals for avoiding the yellowness reaction do lead to an improved yellowness stability, but do not succeed in completely suppressing the yellowing of plastics. For instance, EP 0 492 223 describes a process in which the reactivity of the $TiO_2$ is reduced by silanizing the pigment surface. Also, the application of further metal oxide layers has been employed, but has the disadvantage, in the case of the use of colored oxide layers, of completely changing the color properties of the underlying $TiO_2$-coated pigment and, what is more, the metal oxide layer which then comes to lie on top frequently is just as highly surface-reactive and it may yellow.

The treatment disclosed in EP 0 520 313 A2 of coating the $TiO_2$ layer with an alkaline earth metal titanate and subsequently calcining also does not lead to complete suppression of the yellowness reaction of pigmented plastics.

SUMMARY OF THE INVENTION

It is therefore an object of the present invention to provide surface-modified pigments on the basis of $TiO_2$ which, on incorporation into plastics, do not lead to a yellowness reaction even over a prolonged period.

It has now been surprisingly found that $TiO_2$ pigments or $TiO_2$-coated platelet-shaped substrates which have been coated with borates of the alkaline earth metals and/or double borates of alkali and/or alkaline earth metals are highly effective in suppressing the yellowness reaction in plastics.

The present invention accordingly provides surface-modified pigments based on $TiO_2$ pigments or $TiO_2$ coated platelet-shaped substrates, characterized in that they have been aftercoated with a layer consisting of borates of the alkaline earth metals and/or double borates of the alkali and/or alkaline earth metals.

The present invention further provides a process for producing the pigments of the invention, characterized in that an aqueous solution of titanium dioxide pigments or of titanium dioxide-coated platelet-shaped substrates has added to it, at one and the same time, i.e., simultaneously, a water-soluble alkali and/or alkaline earth metal salt and a water-soluble boron-oxygen compound under conditions which lead to deposition of the borate or double borate on the surface of the pigments or substrates, and in that the thus-coated pigments are separated off, washed and optionally dried or calcined.

The present invention further provides for the use of the pigments according to the invention as yellowness inhibitors in plastics.

Suitable substrates for the surface-modification coating include opaque, non-platelet-shaped $TiO_2$ pigments which are widely used as white pigment and transparent, non-platelet-shaped $TiO_2$ pigments having a diameter below 100 nm, which are increasingly being used as UV absorbers in cosmetics and engineering. Pigments according to the invention may also be based on non-platelet-shaped $TiO_2$ pigments having a diameter from 1 to 10,000 nm.

Suitable base substrates include in particular platelet-shaped, and preferably transparent or semitransparent, substrates composed of, for example, sheet-silicates such as, for example, mica, talc or kaolin, glass, $SiO_2$ or synthetic ceramic flakes, synthetic support-free platelets or other comparable minerals.

It is also possible to use metal platelets such as, for example, aluminum platelets or platelet-shaped metal oxides such as, for example, platelet-shaped iron oxide or bismuth oxychloride. The platelet-shaped substrates typically have a thickness between 0.1 and 5 µm and in particular between 0.2 and 4.5 µm. The extension in the other two dimensions is usually between 1 and 250 µm and in particular between 2 and 200 µm.

The deposition of $TiO_2$ on platelet-shaped substrates can in principle be effected by two processes, the sulfate process described in DE 14 67 468, and the chloride process, described in DE 20 09 566. In both processes, $TiO_2$ is deposited on the platelet-shaped substrate in the anatase form. Further, a process for depositing the rutile form of $TiO_2$ may be used and is described in DE 22 14 545. This form, compared with the anatase form, has a higher refractive index, so that rutile form platelet-shaped substrates have a distinctly higher luster than anatase form titanium dioxide mica pigments and are therefore frequently preferred.

The processes for coating the substrate with $TiO_2$ indicated herein are merely mentioned by way of example and are merely intended to illustrate the invention. It is in fact also possible to use other processes not explicitly described herein, for example CVD processes etc. If no further process step is carried out, the substrate is, after the coating with $TiO_2$, customarily separated off, washed and optionally dried or calcined.

The platelet-shaped substrates can initially also be coated with one or more other metal oxide layers composed of, for example, chromium oxide, iron oxide, zirconium oxide, aluminum oxide, tin oxide and/or further metal oxides before the titanium dioxide layer is applied.

Since the process requires no high shearing forces, the process is also highly suitable for coating pearly luster pigments, as a further substrate. It is possible to use any customary pearly luster pigment, for example mica coatings with colored or colorless metal oxides, such as $TiO_2$, $Fe_2O_3$, $SnO_2$, $Cr_2O_3$, $ZnO$ and other metal oxides, alone or in single layer or in successive layers. The pearly luster pigments, when used as substrates, are first coated with $TiO_2$ and then surface-modified with the borate layer in the manner described above. These pigments are known for example from the German Patents and Patent Applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 502 and 32 35 017 and are commercially available, for example under the trade mark Iriodin® from E. Merck, Darmstadt.

Preferably the base substrates used are pigments which, under the titanium dioxide layer, have not more than two and in particular only one or no further metal oxide layer.

To produce the alkaline earth metal/alkali metal borate layer, an aqueous suspension of non-platelet-shaped $TiO_2$ pigments or $TiO_2$-coated platelet-shaped substrates has added to it a water-soluble alkaline earth metal salt or a mixture of water-soluble alkaline earth metal and/or alkali metal salts and a water-soluble boron-oxygen compound.

Suitable alkaline earth and alkali metal salts include, inter alia, the alkaline earth/alkali metal chlorides, also the alkaline earth/alkali metal nitrates and other water-soluble compounds. The boron-oxygen compounds used are primarily boric acid salts of polyacids, i.e., polyboric acids. Examples of the polyboric acids from which salts are derived may be described by the following formulae:

$$H_{n-2}B_nO_{2n-1} = nH_3BO_3-(n+1)H_2O$$

or $$H_{n-4}B_nO_{2n-2} = nH_3BO_3-(n+2)H_2O$$

The structure of the polyboric acids and polyborates is not known exactly, so it is not possible to provide a value for n. The structure of the polyborates does not depend merely on the substitution of the alkali or alkali metals for hydrogens since the coordination of the borine atom in the molecule, which may be three or four, and the amount of bonded water are also factors. In particular the alkali metal borates are preferred, since in general they are readily soluble in water. The particular preferred compounds used are disodium tetraborate, $Na_2B_4O_7 \cdot 10 H_2O$ (borax), $Ca_2[B_6O_{11}] \cdot 7H_2O$ and $Ca_2[B_6O_{11}] \cdot 5H_2O$.

The temperature of the reaction solution is not very critical and is preferably 20°–80° C., but it is advisable to carry out the precipitation at somewhat higher temperatures, preferably 40°–80° C., since the solubility of borax increases with the temperature of the solvent. The deposition is typically carried out at a pH between 3 and 12.

To carry out the coating, an aqueous suspension of the $TiO_2$ pigments or of the $TiO_2$-coated platelet-shaped substrates is admixed at one and the same time with an aqueous solution of the alkali/alkaline earth metal salts and of the boron-oxygen compound, e.g., borate. The weakly basic character of the borate may produce a small increase in the pH, which can readily be kept at a constant level through the addition of dilute acids, preferably mineral acids, in particular HCl. The alkali/alkaline earth metal salts and the borate are preferably added in molar ratios which correspond to the stoichiometry of the borate to be precipitated, i.e., for example, 2 mol of $B_2O_3$ per 1 mol of CaO in the precipitation of $CaB_4O_7 \rightarrow CaO \times 2B_2O_3$ or 3 mol of $B_2O_3$ per 2 mol of CaO in the precipitation of $Ca_2B_6O_{11} \rightarrow 2CaO + 3B_2O_3$. Preferably the molar ratio of alkali/alkaline earth metal salt to borate is from 1:1 to 1:3.

The use of 1 mol of alkaline earth metal chloride and 1 mol of alkali metal tetraborate results in the following reaction equation which, however, is only to be understood as by way of example and is merely intended to illustrate the invention without limiting it:

$$CaCl_2 + Na_2[B_4O_5(OH)_4] \Rightarrow Ca[B_4O_5(OH)_4] + 2NaCl$$

Borates of the alkaline earth metals and double borates of alkaline earth and/or alkali metals are only sparingly soluble or insoluble, so that the above mentioned compound is precipitated onto the substrate. The pigment thus aftercoated is separated off, washed and optionally dried or calcined.

The drying and specifically the calcining at temperatures>500° C., preferably 800°–1000° C., of the borate-coated pigments brings about a multi-stage dewatering process which leads, on the one hand, to the formation of a crystalline, highly refractive modification of the $TiO_2$ and, on the other hand, to the formation of a thin coating composed of a crystalline alkaline earth metal borate or alkaline earth/alkali metal double borate. This process may be illustrated with the following equation:

$$Ca[B_4O_5(OH)_4] \xrightarrow{\Delta} CaB_4O_7 + 2H_2O \uparrow$$

The precipitation is preferably carried out in such a way that the calcining leaves a relatively thin alkaline earth/alkali metal borate layer of a few nanometers, e.g., 0.1 to 10 nm, preferably 0.1 to 5 nm, since such a thin top layer will have only an insignificant influence, if any, on the optical properties of the substrate, which is frequently desirable. Based on the pigment of the invention, the mass proportion of the borate layer is preferably between 0.1 and 20 mass percent and in particular between 0.2 and 10 mass percent.

Plastics or plastics systems pigmented with the pigments of the invention are free of any yellowing whatsoever, even over prolonged periods, in contradistinction to plastics systems stabilized by other methods.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 43 29 613.0, filed Sep.2, 1993, are hereby incorporated by reference.

EXAMPLES

The examples which follow are intended to illustrate the invention without limiting it:

EXAMPLE 1

A suspension of 10.7 kg of mica of the particle size 5–15 μm is suspended in 280 l of water and adjusted to pH 2.2. Then an aqueous, approximately 30% $TiCl_4$ solution is added at a rate of about 16 l/h while the pH is maintained at 2.2 with about 30% NaOH. After a silvery white interference color has been reached, the metering is discontinued and the mixture is subsequently stirred for ½ h. After the pH has been adjusted with dilute NaOH to pH 6.7, the simultaneous metered addition at a rate of 15 l/h is commenced of a solution of 882 g of $Na_2B_4O_7 \times 10\ H_2O$ in 15 l of $H_2O$ and of a solution of 350 g of $CaCl_2 \times 2\ H_2O$ in 15 l of $H_2O$. The reaction product is filtered off, dried and calcined at 850° C.

EXAMPLE 2

Comparative Example (EP 0 520 313)

Example 1 was initially followed to prepare a silvery white pearl luster pigment. After the pH had been adjusted with dilute NaOH to pH 9, solutions of 410 g of $CaCl_2 \times 2\ H_2O$ in 10 l of $H_2O$ and 0.6 l of $H_2O_2$ (30%) in 9.4 l of $H_2O$ are metered in simultaneously at a rate of 15 l/h. The reaction product is filtered off, dried and calcined at 850° C.

EXAMPLE 3

Comparative Example (EP 0 520 313)

Initially Example 1 is followed to prepare a silvery white pearl luster pigment. Then 0.63 kg of $Na_2(C_2O_4)$ is introduced in solid form, and the pH rises from 2.2 to 4.5. Then 0.63 kg of $CaCl_2 \times 2\ H_2O$ in 15 l of $H_2O$ is metered in at a rate of 15 l/h while the pH is kept essentially constant. The reaction product is filtered off, dried and calcined at 850° C.

Example 4

Comparative Example

Example 1 is repeated to prepare a silvery white $TiO_2$-coated mica pearl luster pigment. The product is filtered off without aftercoating, dried and calcined at 850° C.

EXAMPLE 5

A suspension of 11 kg of mica of the particle size 5–15 μm is suspended in 280 l of water and adjusted to pH 2.2. Then an aqueous, approximately 30% $TiCl_4$ solution is added at a rate of about 16 l/h while the pH is maintained at 2.2 with about 30% NaOH. After a silvery white interference color has been reached, the metering is discontinued and the mixture is subsequently stirred for 0.5 h. After the pH has been adjusted with dilute NaOH to pH 6.7, the simultaneous metered addition at a rate of 15 l/h is commenced of a solution of 600 g of $Na_2B_4O_7 \times 10\ H_2O$ in 15 l of $H_2O$ and of a solution of 235 g of $CaCl_2 \times 2\ H_2O$ in 15 l $H_2O$. The reaction product is filtered off, dried and calcined at 850° C.

Determination of the Surface Reactivity

To show to what extent the coated pigments lead to yellowing in plastics systems, the following test method is used:

150 mg of pigment are weighed out, admixed with 5 ml of a 1% solution of propyl gallate in 2-propanol, shaken up and left to stand for 15 min. After transfer into a special round cuvette, the solution is allowed to stand for 1 min and the CIELAB values are determined with a Johne & Reilhofer instrument under 45°/0°. To determine the blank value, 150 mg of pigment are suspended in 5 ml of 1-propanol and measured as above. The measurements obtained with propyl gallate are corrected for the blank values.

The measure used for the surface reactivity is the change in the b value (=shift of the masstone color towards yellow). A large positive b value denotes strong yellowing. If the b value does not change, no yellowing is observed. Δb=b value-b value (blank).

TABLE 1

|    | Ex. 1 | Ex. 2 | Ex. 3 | Ex. 4 | Ex. 5 |
|----|-------|-------|-------|-------|-------|
| Δb | −0.1  | 1.5   | 5.8   | 15.0  | 0.3   |

The measurements in Table 1 illustrate that the pigments of the invention completely suppress yellowing in plastics.

What is claimed is:

1. A surface-modified pigment which inhibits yellowing of plastic compositionsin which it is incorporated, comprising titanium dioxide pigments or titanium dioxide-coated platelet-shaped substrates coated with a layer consisting essentially of a borate of an alkaline earth metal or double borate of an alkali and/or alkaline earth metal.

2. A process for preparing the surface-modified pigment of claim 1, comprising providing an aqueous solution of titanium dioxide pigments or of titanium dioxide-coated platelet-shaped substrates, adding thereto at one and the same time, a water-soluble alkali and/or alkaline earth metal salt and a water-soluble boron-oxygen compound under conditions suitable for deposition as a coating on the surface of the pigments or substrates the borate of an alkaline earth metal or double borate of an alkali and/or alkaline earth metal, separating the thus-coated pigment or substrate, and optionally washing, drying and/or calcining the pigment or substrate.

3. The surface-modified pigment according to claim 1, wherein the proportion of borate or double borate, based on the total pigment, is 0.1–20 mass percent.

4. The surface-modified pigment according to claim 1, wherein the platelet-shaped substrate is mica.

5. The surface-modified pigment according to claim 1, wherein the platelet-shaped substrate is $SiO_2$ flakes.

6. The surface-modified pigment according to claim 1, wherein the platelet-shaped substrate is a pearl luster pigment.

7. The process according to claim 2, wherein the water-soluble boron-oxygen compound is a salt of a polyboric acid.

8. The process according to claim 2, wherein the boron-oxygen compound is disodium tetraborate.

9. The process according to claim 2, wherein the alkali and/or alkaline earth metal salts and the boron-oxygen compound are used in molar ratios which correspond to the stoichiometry of the borate to be precipitated.

10. The process according to claim 2, wherein the deposition of the borate or double borate is carried out at a temperature of 20°–80° C.

11. A plastics system composition containing a surface-modified pigment according to claim 1.

12. A method for inhibiting yellowing in plastics or plastics systems comprising adding thereto a surface-modified pigment according to claim 1.

13. The surface-modified pigment of claim 1, wherein the layer comprising essentially of a borate of an alkaline earth metal, or double borate of an alkali and/or alkaline earth metal, is the outermost layer of the pigment.

14. The surface-modified pigment of claim 1, wherein the layer consisting essentially of a borate of an alkaline earth metal or double borate of an alkali and/or alkaline earth metal is coated directly on the titanium dioxide pigment or the titanium dioxide coating of the pigment.

15. The surface-modified pigment of claim 1, based on a titanium dioxide-coated platelet-shaped substrate.

16. The surface-modified pigment of claim 1, wherein the layer consisting essentially of a borate of an alkaline earth metal or double borate of an alkali and/or alkaline earth metal has a thickness of 0.1 to 10 nm.

17. The surface-modified pigment of claim 1, wherein the titanium dioxide pigment or coating is in the anatase form.

18. A method for improving the stability of a plastic or plastic system containing a pigment which is subject to interaction between a colorant and a stabilizer or antioxidant, comprising, in said plastic or plastic system, inhibiting yellowing upon storage due to migration of stabilizer or antioxidant to the surface of the pigment by incorporating in the plastic or plastic system a surface-modified pigment according to claim 1.

* * * * *